(12) United States Patent
Abarca Melo et al.

(10) Patent No.: US 9,114,424 B2
(45) Date of Patent: Aug. 25, 2015

(54) PIPE COATING

(71) Applicant: Weir Minerals Australia, Ltd., Artarmon NSW (AU)

(72) Inventors: Ricardo Abarca Melo, Santiago (CL); Jaime Ramirez Toledo, Tejas de Chena (CL); Wilfredo San Martin Cisterna, Villa Conquistadores (CL)

(73) Assignee: Weir Vulco, S.A. (CL)

( * ) Notice: Subject to any disclaimer, the term of this patent is extended or adjusted under 35 U.S.C. 154(b) by 121 days.

(21) Appl. No.: 13/850,180

(22) Filed: Mar. 25, 2013

(65) Prior Publication Data

US 2013/0216706 A1    Aug. 22, 2013

Related U.S. Application Data

(63) Continuation of application No. 12/734,861, filed as application No. PCT/AU2008/001757 on Nov. 27, 2008, now Pat. No. 8,403,657.

(30) Foreign Application Priority Data

Nov. 27, 2007  (CL) .................................. 03408-2007

(51) Int. Cl.
    *B29C 33/30*  (2006.01)
    *B05D 7/22*   (2006.01)
    *B29C 33/50*  (2006.01)
    *B29C 33/76*  (2006.01)
    *F16L 43/00*  (2006.01)
    *F16L 57/06*  (2006.01)
    *F16L 101/16* (2006.01)

(52) U.S. Cl.
    CPC .............. *B05D 7/222* (2013.01); *B29C 33/505* (2013.01); *B29C 33/76* (2013.01); *F16L 43/002* (2013.01); *F16L 57/06* (2013.01); *B29K 2875/00* (2013.01); *F16L 2101/16* (2013.01)

(58) Field of Classification Search
    CPC ...... B05D 7/222; B29C 33/76; B29C 33/505; B29K 2875/00; F16L 57/06; F16L 43/002; F16L 2101/16
    USPC ........ 264/36.15, 36.16, 36.17, 269, 270, 506, 264/512, 563, 573, 46.5, 46.6, 338, 632, 264/634, 636
    See application file for complete search history.

(56) References Cited

U.S. PATENT DOCUMENTS 752,249 A    2/1904  Nickerson
955,235 A    4/1910  Wellman
(Continued)

FOREIGN PATENT DOCUMENTS

GB      2159598      12/1985

*Primary Examiner* — Yogendra Gupta
*Assistant Examiner* — Emmanuel S Luk
(74) *Attorney, Agent, or Firm* — Morriss O'Bryant Compagni

(57) ABSTRACT

Apparatus (1) for enabling a coating to be applied to an internal surface of a pipe elbow or bend C comprises a flexible body (2) adapted for location to extend within the pipe elbow or bend, and a bendable core (3) extending through the body. Bending of the core causes the flexible body to be bent in a similar manner. A method for applying the coating to the internal surface of the pipe elbow or bend (C) comprises the steps of shaping the flexible body (2) and locating it to extend within the pipe elbow or bend, and introducing a coating material so as to flow around and into a space defined between the flexible body and the internal surface of the elbow or bend.

10 Claims, 3 Drawing Sheets

(56) References Cited

U.S. PATENT DOCUMENTS

| | | | |
|---|---|---|---|
| 1,801,346 A * | 4/1931 | Heath | 249/175 |
| 2,646,606 A | 7/1953 | Easterday | |
| 2,723,426 A | 11/1955 | Pelley | |
| 4,298,330 A | 11/1981 | Davis | |
| 4,352,387 A | 10/1982 | Yamaguchi | |
| 4,500,485 A * | 2/1985 | Willemsen et al. | 264/313 |
| 4,721,280 A | 1/1988 | Barainsky | |
| 4,738,816 A | 4/1988 | Anderson | |
| 5,176,866 A * | 1/1993 | Tanaka et al. | 264/219 |
| 5,225,215 A * | 7/1993 | Syvrud | 425/438 |
| 5,350,139 A | 9/1994 | Leyderman | |
| 5,387,098 A * | 2/1995 | Willden | 425/393 |
| 5,690,884 A | 11/1997 | Cerny | |
| 5,795,524 A | 8/1998 | Basso, Jr. et al. | |
| 6,537,484 B2 | 3/2003 | Nakagawa et al. | |
| 6,672,857 B2 | 1/2004 | Hecken et al. | |
| 6,910,876 B2 | 6/2005 | Ainsworth et al. | |
| 2003/0155694 A1* | 8/2003 | Rowley | 264/506 |
| 2006/0017192 A1* | 1/2006 | Claus et al. | 264/159 |
| 2009/0115109 A1* | 5/2009 | Albright | 264/334 |

* cited by examiner

PIPE COATING

TECHNICAL FIELD

Disclosed is an apparatus and method for internally coating a pipe in the form of a bend or elbow. Such coated pipe bends/elbows find particular though not exclusive application in the mining and chemical industries when transporting abrasive, erosive and corrosive slurries, concentrates, tailings and other flowable solid and/or liquid mixtures. The term "pipe" as employed herein is intended to include ducts, conduits, pipelines, tubes, chutes, cylinders and so on.

BACKGROUND ART

The mining industry employs ore and concentrate pipes to transport ores, concentrates, tailings and other materials over long distances. Such pipes can be constructed from metal/metallic sections joined together to form an extended pipeline, and the ores being conveyed can often be in the form of wet slurries or even dry particulate solids.

Many changes of direction can occur along the path of such pipelines, both in the vertical and in the horizontal plane, requiring the use of elbows and bends. Some such elbows and bends can turn the pipeline up to angles of 180°, for example, in energy dissipation stations used with pipelines that fall from elevations exceeding 500 meters.

When transporting material such as abrasive/erosive/corrosive slurries, concentrates, tailings, a high level of pipe erosion can occur, especially at any bends in the pipeline, and most especially where the bends are located at the end of a pipeline fall. To avoid wear and/or corrosion, the piping can be internally coated with an elastomeric material (e.g. rubber, or a synthetic material such as polyurethane or the like).

Pipe diameters in such pipelines can vary between 50 and 500 mm, with it being desirable for each given pipe diameter to have a continuous coating of elastomeric material throughout its length. In some instances a specific uniform thickness is desirable and the coating thickness is selected specifically to the pipe diameter.

Coatings of rubber are most used for coarse particulate materials with a size above 2 mm due to the better resistance afforded by rubber at such particle sizes. For smaller particle size materials, polyurethane offers better resistance to abrasion. Thus, for materials such as concentrates and tailings, usually polyurethane is used as the coating material.

A uniform coating is more easily applied to straight sections of pipe, but less so in the bends and elbows, where it is difficult to achieve a uniform thickness, especially when the coating to be applied is of a synthetic type, such as polyurethane.

SUMMARY OF THE DISCLOSURE

In a first aspect there is disclosed apparatus for enabling a coating to be applied to an internal surface of a pipe elbow or bend. The apparatus comprises:

a flexible body adapted for location to extend within the pipe elbow or bend; and a bendable core, extending through the body, whereby bending of the core causes the flexible body to be bent in a similar manner.

The apparatus can facilitate the application of an internal coating (lining) having a uniform thickness and can be used to apply coatings of synthetic elastomeric materials, such as polyurethane. In this regard, the radius of curvature of the body can be adapted (matched) to the internal radius of curvature of the pipe elbow or bend. Using the bendable core, the flexible body can be shaped (e.g. by hand or by a template/tool in a preset way) so as to define a uniform annular space between the elbow/bend internal wall and the body's external surface. This space is then able to be filled with a uniform coating of erosion-resistant, elastomeric material. Once the coating has cured/solidified, the flexibility of the body then facilitates an easy apparatus extraction.

In other arrangements, the internal coating need not be of uniform thickness. This can be achieved by defining different shapes of annular space between the external surface of the flexible body and the elbow/bend internal wall.

Throughout this specification when the term "coating" is used it is interpreted to mean both linings of any thickness of material, from a single layer (such as one made of polyurethane) to a thick wear resistant liner (such as one made of rubber or harder materials such as ceramic).

In one embodiment the flexible body is elongate and has a profile which, when the core is suitably bent, can approximate the profile but be spaced from the internal surface of the pipe elbow or bend. For example, the flexible body may have a cylindrical profile and may be formed from an elastomeric material. The core can then extend centrally through the cylindrical body.

The flexible body can be of polyurethane. The core can be formed from a bendable metallic rod. In one embodiment the core can have a rectangular cross-sectional profile. In this embodiment the height of the core profile may range between 0.3 D and 0.7 D, and the thickness of the core profile may range between 0.01 D and 0.06 D, where D is the internal diameter of the pipe elbow or bend.

In one embodiment the body and core may be adapted at opposing ends thereof for being mounted to respective opposing ends of the elbow or bend. In one variation, the adaptation at each end of the body and core can comprise a disk that extends across a respective end of the body. The disk can be connected to the core, centrally at a disk face.

In one embodiment the adaptation at each end of the body may further comprise a body flange that is adapted for being coupled to respective pipe coupling flanges located at respective ends of the pipe elbow or bend. Each body flange may be releasably coupled to a respective end of the body via the disk and through the use of one or more releasable fasteners. Each body flange may be of metal and can be adapted for being bolted to its respective pipe coupling flange. Each body flange may also comprise a pathway through which a flowable coating material can be introduced when the apparatus is located in the pipe elbow or bend.

In one embodiment the apparatus can further comprise:
(i) a mechanism for adjusting the body length with respect to the elbow or bend; and/or
(ii) a mechanism for adjusting the body orientation with respect to the elbow or bend.

The mechanism can comprise:
in (i) one or more washers for positioning adjacent to one or both disks;
in (ii) one or more wedges for positioning near to one or both disks.

In one embodiment the thickness of each washer may range between 0.5 and 2 mm. The thickness of each wedge may, at its shorter side, range between 0.5 and 2 mm. Further, the thickness of each wedge may, at its longer side, range between 1 and 4 mm.

In one embodiment the diameter of the body can be selected such that in use it leaves a space therearound that ranges between 3 and 25 mm with respect to the internal wall of the elbow or bend. In still further embodiments the space between an outer surface of the flexible body and an inner surface of the pipe elbow or bend need not be evenly annular, in situations where the internal coating needs to be designed thicker in some places and thinner in others.

In one form the apparatus can take the form of a mandrel.

In a second aspect there is disclosed a method for applying a coating to an internal surface of a pipe elbow or bend, the method comprising the steps of shaping a flexible body and locating it to extend within the pipe elbow or bend; and introducing a coating material so as to flow around and into a space defined between the flexible body and the internal surface of the pipe elbow or bend.

The method can comprise the further steps of:

allowing the coating material to cure and/or solidify;

removing the flexible body so as to leave the coating material behind as a lining on the internal surface of the pipe elbow or bend.

The flexible body employed in the method of the second aspect can form a part of the apparatus of the first aspect, whereby the method can make use of that apparatus.

In the method the flexible body can be adapted to have a body flange associated with each end thereof. Thus, after locating the body to extend within the pipe elbow or bend, each body flange can be releasably coupled to a respective end of the body using one or more releasable fasteners.

Further, after each body flange is releasably coupled to its respective body end, the body flange can be coupled to a respective pipe coupling flange located at an end of the elbow or bend using one or more releasable fasteners.

In one embodiment of the method, each body flange can comprise a pathway therethrough, wherein the coating material can be introduced into the space via at least one such pathway.

In one embodiment of the method, the body length and/or the body orientation may be adjusted with respect to the pipe elbow or bend. In one embodiment of the method the step of adjustment of the body orientation occurs prior to introducing the coating material, so that the space is adjusted to a predetermined form. In other embodiments the adjustment of the body orientation can be made after the introduction of the coating material but prior to the solidification or curing of the coating material.

DESCRIPTION OF THE DRAWINGS

Notwithstanding any other forms that may fall within the scope of the apparatus and method as set forth in the Summary, a specific embodiment of the apparatus and method will now be described, by way of example only, and with reference to the accompanying drawings in which.

DETAILED DESCRIPTION OF THE SPECIFIC EMBODIMENT

Figure 1:
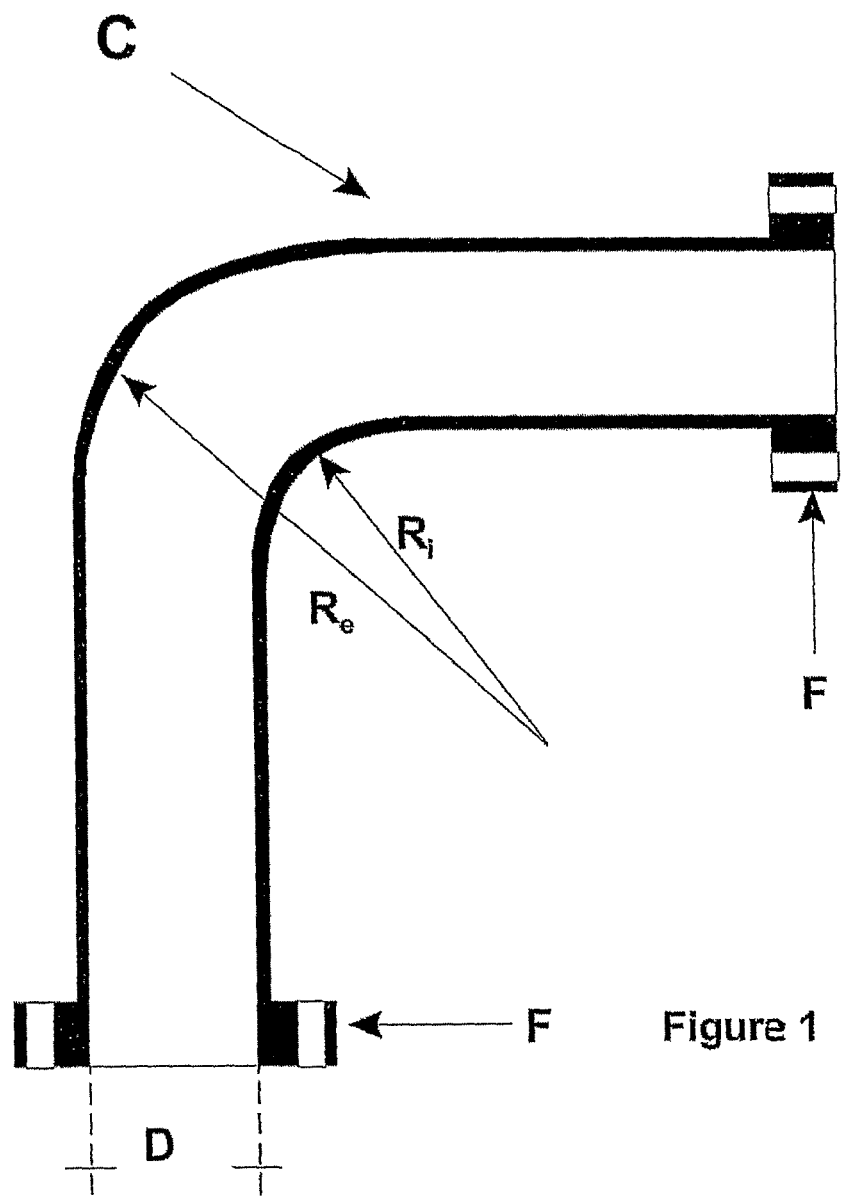
FIG. 1 shows a cross-section of a 90° elbow for use in a pipeline.

FIG. 1 shows a pipe elbow C in cross-section, comprising opposing union flanges F for connecting to opposing sections of pipe. The bend in the pipe elbow has external and internal curvature radii, $R_e$ and $R_i$ respectively and an effective diameter D.

Figure 2:
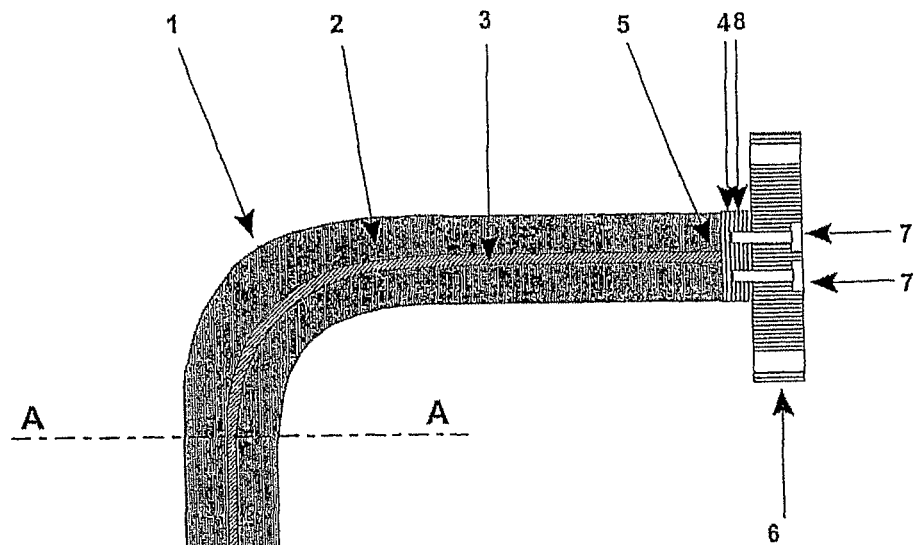
FIG. 2 shows an embodiment of an apparatus for enabling the internal coating of the 90° elbow of FIG. 1.
Figure 3:
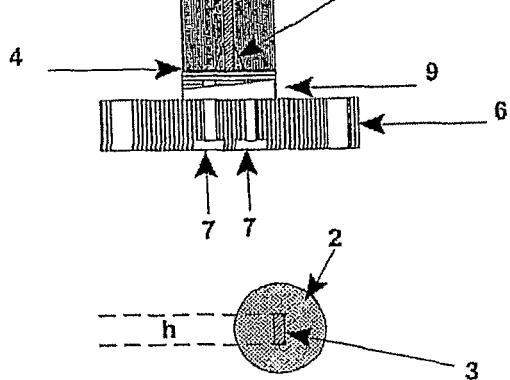
FIG. 3 shows a cross-section of the apparatus taken on the plane A-A of FIG. 2.

Referring to FIG. 2, an apparatus for enabling the internal coating of the 90° elbow of FIG. 1 comprises a mandrel 1 that is formed by a cylindrical body of elastomeric material 2 (such as polyurethane). A flexible core 3 extends through the centre of the cylindrical body 2, as depicted in FIGS. 2 and 3. The core can be of a bendable metallic rod, and can be bent into shape to simulate the internal curvature (central radius) of the elbow or bend.

Disks 4 are arranged at respective ends of the mandrel, with each disk 4 being connected to the core 3 by a fastening mechanism. In the embodiment depicted the connection is effected by means of web stiffeners 5, which can be welded or bolted to the core 3 and to each of the disks 4.

To apply the coating internally to an elbow or bend the mandrel 1 is, in this embodiment, fastened to and within the elbow C. In this regard, after appropriately shaping (e.g. by hand, or using a tool or template) and then locating the cylindrical body 2 within the elbow or bend, opposing flanges 6 are each bolted to a respective disk 4 by bolts 7. In the embodiment depicted, four bolts 7 are employed at each mandrel end. Each flange 6 is then bolted to a respective flange F of the elbow C by bolts (not shown). Each flange 6 is provided with a passage for feeding liquid polyurethane into the elbow or bend C, so as to flow around and surround the cylindrical body 2, and to subsequently cure/solidify in the annular space 20 which is shown in FIG. 3.

The diameter of the mandrel is selected such that it leaves an annular space therearound that ranges from about 3 to 25 mm from the mandrel's outside surface to the adjacent internal wall of the elbow C.

In the embodiment shown, the core 3 has a rectangular profile, wherein a height h of the core 3 can be selected to range between 0.3 D and 0.7 D, and wherein its thickness can be selected to range between 0.01 D and 0.06 D, where D is the internal diameter of the pipe.

Figure 4:
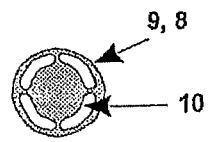
FIG. 4 shows a plan view of a position-adjusting washer and wedge for use with the apparatus of FIG. 2.
Figure 5:
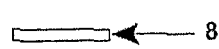
FIG. 5 shows a side view of the position-adjusting washer of FIG. 4.
Figure 6:
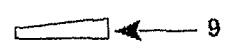
FIG. 6 shows a cross-sectional side view of the adjusting wedge of FIG. 4.
Figure 7:
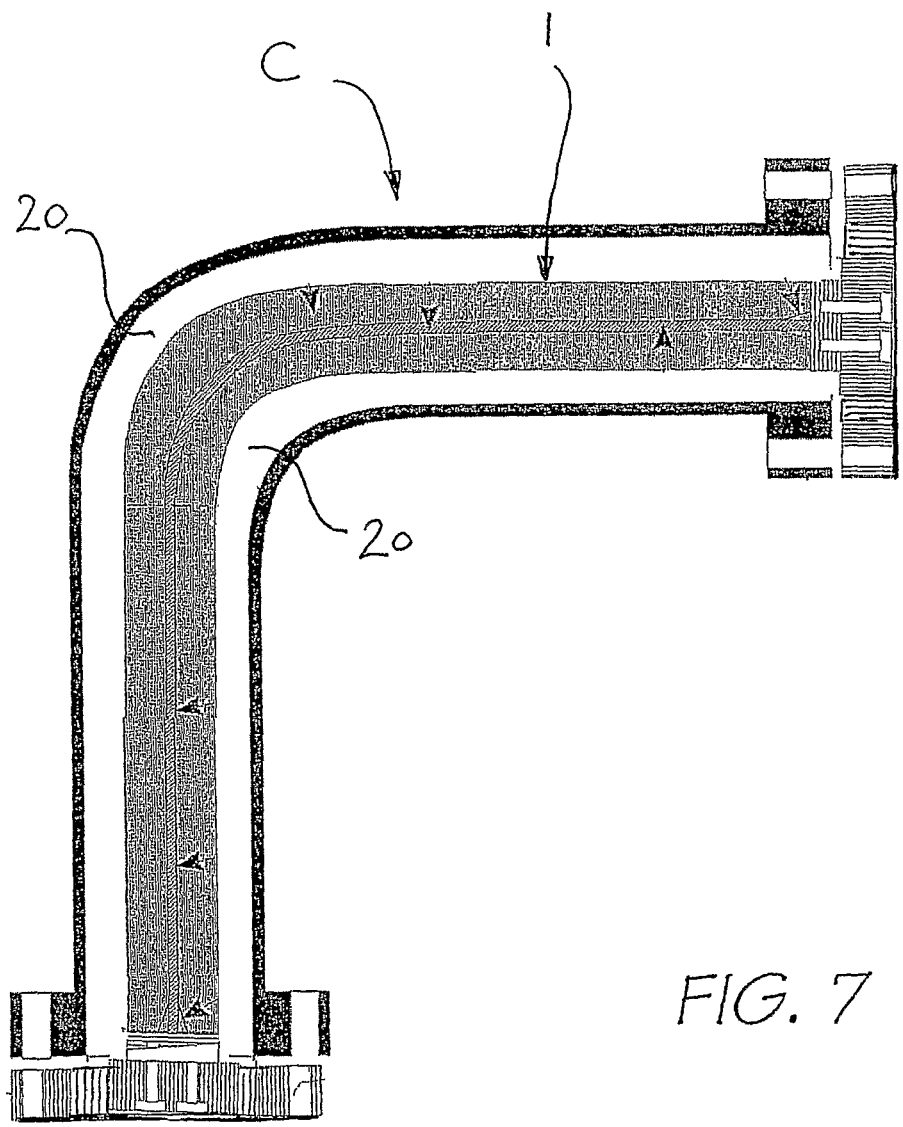
FIG. 7 shows a combination cross-section of the 90° elbow shown in FIG. 1 when fitted with the apparatus for enabling the internal coating of the 90° elbow shown in FIG. 2.

In many cases, elbows or bends that are manufactured using non-fully automated methods can present minute differences and poorer tolerances both in their overall dimensions and in curvature of radii. To accommodate this, the length and curvature radius of the mandrel can readily be adjusted to each particular elbow. In this regard, the mandrel 1 is provided with washers 8 that allow the length of mandrel 1 to be adjusted to suit the particular elbow. The washers 8 may have a thickness ranging between 0.5 and 2 mm. Further, the mandrel 1 can be provided with wedges 9 that can be used to regulate and adjust to variations in the curvature radius in the manner of a cam adjustment. The wedges 9 may have a thickness ranging, at the shorter side, between 0.5 and 2 mm and, at the longer side, between 1 and 4 mm. In order to modify the position of the washers and wedges in relation to the bolts 7 the washers 8 and wedges 9 are provided with grooves 10 (FIG. 4). This allows for washer rotation on an axis of core 3, to effect the adjustments to optimise the mandrel shape to the elbow interior profile.

In its method of use, a liquid polyurethane/rubber/ceramic lining material is fed into the annular space which surrounds the mandrel 1 and is then allowed to cool and solidify over a period of time. In some embodiments it may be possible to make some adjustment to the position of the mandrel 1 at this stage whilst the lining material is still fluid, but normally the mandrel 1 position has been pre-determined within the pipe bend or elbow C before the lining material is fed into the annular space 20. After solidification the mandrel 1 is released from its coupled position to the pipe bend or elbow C by undoing the aforementioned flange bolts 7. The mandrel 1 is then slidingly withdrawn, thereby leaving a corresponding elongate hole in the interior of the lined pipe bend or elbow C.

In an embodiment, the elastomeric material of mandrel body 2 is formed of polyurethane, which can be adapted (e.g. spray-coated with a release agent) to facilitate its disengagement from the polyurethane/rubber/ceramic lining material after the feeding in and curing of that lining material in the elbow or pipe bend. The flexible core 3 can comprise a repeatedly bendable metal. The disks 4 and flanges 6 are also of metal.

Whilst specific apparatus and method embodiments have been described, it should be appreciated that the apparatus and method may be embodied in many other forms.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method.

The invention claimed is:

1. A method for applying a coating to an internal surface of a pipe elbow or bend, the method comprising the steps of:
    shaping a flexible body prior to locating it within the pipe elbow or bend, the flexible body having a body flange associated with each end thereof, each body flange comprising a pathway therethrough;
    locating the flexible body to extend within the pipe elbow or bend such that each body flange is able to be releasably coupled to a respective end of the pipe elbow or bend; and
    introducing a coating material via at least one of the pathways so as to flow around and into a space defined between the flexible body and the internal surface of the pipe elbow or bend.

2. A method according to claim 1, comprising the further steps of:
    allowing the coating material to cure and/or solidify; and
    removing the flexible body so as to leave the coating material behind as a lining on the internal surface of the pipe elbow or bend.

3. A method according to claim 1, wherein the flexible body forms part of an apparatus for enabling a coating to be applied to an internal surface of a pipe elbow or bend, the apparatus comprising:
    a bendable solid rod that is able to be bent into shape to simulate the internal curvature of a pipe elbow or bend; and
    a flexible elastomeric body that is moulded to the bendable solid rod and has an outside surface, the flexible elastomeric body being adapted for location to extend within the pipe elbow or bend such that the outside surface of the flexible elastomeric body is positioned for orientation toward an internal surface of a pipe elbow or bend to enable a coating to be applied to an internal surface of the pipe elbow or bend, and
    wherein the bendable solid rod extends through the flexible elastomeric body, whereby the bendable solid rod is bent into shape to simulate the internal curvature of a pipe elbow or bend, the flexible elastomeric body being bent in a similar manner.

4. A method according to claim 1, wherein each body flange is releasably coupled to a respective end of the body using one or more releasable fasteners.

5. A method according to claim 4, wherein after each body flange is releasably coupled to its respective body end, the body flange is coupled to a respective pipe coupling flange located at an end of the elbow or bend using one or more releasable fasteners.

6. A method according to claim 1, wherein the body length and/or the body orientation is adjusted with respect to the pipe elbow or bend.

7. A method according to claim 6, wherein the step of adjustment of the body orientation occurs prior to introducing the coating material.

8. The method according to claim 1, further comprising the step of:
    adjusting the length and curvature radius of the flexible body to suit the pipe elbow or bend.

9. A method according to claim 8, wherein the flexible body is provided along its length with washers that allow the length of the body to be adjusted to suit the pipe elbow or bend, or is provided with wedges that are used to regulate and adjust to variations in the curvature radius in the manner of a cam adjustment.

10. A method for applying a coating to an internal surface of a pipe elbow or bend, the method comprising the steps of:
    shaping a flexible body prior to locating it within the pipe elbow or bend, the flexible body forming part of an apparatus for enabling a coating to be applied to an internal surface of a pipe elbow or bend, the apparatus comprising:
        a bendable solid rod that is able to be bent into shape to simulate the internal curvature of a pipe elbow or bend, and
        a flexible elastomeric body that is moulded to the bendable solid rod and has an outside surface, the flexible body being adapted to have a body flange associated with each end thereof and each body flange comprises a pathway therethrough, the flexible elastomeric body being adapted for location to extend within the pipe elbow or bend such that the outside surface of the flexible elastomeric body is positioned for orientation toward an internal surface of a pipe elbow or bend to enable a coating to be applied to an internal surface of the pipe elbow or bend, and
        wherein the bendable solid rod extends through the flexible elastomeric body, whereby the bendable solid rod is bent into shape to simulate the internal curvature of a pipe elbow or bend, the flexible elastomeric body being bent in a similar manner;
    locating the flexible body to extend within the pipe elbow or bend;
    releasably coupling each body flange to a respective end of the pipe elbow or bend using one or more releasable fasteners; and
    introducing a coating via at least one such pathway formed in each said body flange so as to flow around and into the space defined between the flexible body and the internal surface of the pipe elbow or bend.

* * * * *